United States Patent
Bourqui et al.

(10) Patent No.: US 8,246,120 B2
(45) Date of Patent: Aug. 21, 2012

(54) FULLY ELECTRICALLY CONTROLLED ELECTRICAL BRAKING SYSTEM FOR A ROAD VEHICLE

(75) Inventors: Gerard Bourqui, Villars-sur-Glane (CH); Fabrice Coudre-Mauroux, Noreaz (CH); Daniel Laurent, Marly (CH); Jean-Louis Linda, La Tour-de-Treme (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 778 days.

(21) Appl. No.: 12/293,945

(22) PCT Filed: Mar. 20, 2007

(86) PCT No.: PCT/EP2007/052660
§ 371 (c)(1),
(2), (4) Date: May 5, 2009

(87) PCT Pub. No.: WO2007/107576
PCT Pub. Date: Sep. 27, 2007

(65) Prior Publication Data
US 2010/0065386 A1 Mar. 18, 2010

(30) Foreign Application Priority Data

Mar. 23, 2006 (FR) .................................. 06 02551
Jun. 26, 2006 (FR) .................................. 06 06022

(51) Int. Cl.
*B60T 13/00* (2006.01)

(52) U.S. Cl. .................. 303/20; 303/113.2; 303/122.04; 303/152; 701/76; 318/434

(58) Field of Classification Search .................. 303/20, 303/112, 113.2, 122.04, 124, 152; 701/22, 701/76; 318/139, 434
See application file for complete search history.

(56) References Cited

U.S. PATENT DOCUMENTS
5,632,534 A 5/1997 Knechtges .................... 303/152
(Continued)

FOREIGN PATENT DOCUMENTS
DE 100 54 368 A1 5/2002
(Continued)

*Primary Examiner* — Pamela Rodriguez
(74) *Attorney, Agent, or Firm* — Fitzpatrick, Cella, Harper & Scinto

(57) ABSTRACT

A fully electrically controlled electric braking system is provided for a road vehicle fitted with wheels (1). Each of the wheels is connected for rotation to at least one rotary electric machine (2) specific thereto, with at least one electronic wheel control module (23) controlling the electric machine(s) (2) of that wheel. Each electronic wheel control module (23) makes it possible to impart selectively to a corresponding wheel a control torque of determined amplitude and sign, in such a way that the corresponding wheel imparts to the vehicle a drive force or a braking force in accordance with the control torque. The system includes a central unit (3) for managing vehicle displacement, the central unit (3) controlling all the electronic wheel control modules (23). The central unit (3) has a vehicle braking mode activated by a vehicle braking control signal having a given amplitude representing a total desired braking force for the fully electrically controlled wheels. In the braking mode, whatever the amplitude of the braking control signal, the central unit (3) controls all the electronic wheel control modules (23) in such a way that the sum of the longitudinal forces of all the wheels is a function of the amplitude of the braking control signal, the function being proportional, for example.

19 Claims, 4 Drawing Sheets

U.S. PATENT DOCUMENTS

| | | | |
|---|---|---|---|
| 5,961,190 A * | 10/1999 | Brandmeier et al. | 303/152 |
| 5,992,950 A | 11/1999 | Kumar | 303/151 |
| 6,113,119 A | 9/2000 | Laurent et al. | 280/124.1 |
| 6,157,887 A * | 12/2000 | Zittlau | 701/70 |
| 6,709,075 B1 | 3/2004 | Crombez | 303/3 |
| 6,820,715 B2 | 11/2004 | Laurent et al. | 180/443 |
| 6,991,061 B2 | 1/2006 | Laurent | 180/402 |
| 7,096,098 B2 | 8/2006 | Auguet et al. | 701/22 |
| 7,096,985 B2 | 8/2006 | Charaudeau et al. | 180/65.2 |
| 2003/0125847 A1 | 7/2003 | Tinskey | 701/1 |
| 2005/0225165 A1 * | 10/2005 | Naik et al. | 303/20 |

FOREIGN PATENT DOCUMENTS

| | | |
|---|---|---|
| EP | 0 878 332 A1 | 11/1998 |
| FR | 2 776 966 A1 | 10/1999 |
| GB | 2 344 799 A | 6/2000 |
| GB | 2 383 567 A | 7/2003 |
| WO | WO 03/065546 A2 | 8/2003 |

* cited by examiner

FULLY ELECTRICALLY CONTROLLED ELECTRICAL BRAKING SYSTEM FOR A ROAD VEHICLE

FIELD OF THE INVENTION

The present invention relates to road vehicles. It relates in particular to braking systems for road vehicles, in which the braking systems use electrical traction.

Electrical vehicles include vehicles in which the electrical energy necessary for displacement thereof is stored in batteries and vehicles in which the electrical energy is produced on board, by a thermal engine driving a generator or by a fuel cell. For such vehicles, traction is ensured by one or more electric machines. Braking in such vehicles is ensured by a conventional mechanical braking system, with the mechanical braking sometimes being electrically assisted.

Now, because an electrical machine may be reversible, it may also be used as an electrical generator during vehicle braking phases and in this case the electrical machine converts mechanical braking energy into electrical energy, which the vehicle has to absorb, optionally by thermal dissipation. This operating mode is often called "electrical braking" or "regenerative braking".

Numerous vehicles using electrical traction have already been proposed in the prior art. Mention may, for example, be made of U.K. patent application GB 2 383 567. This document describes a four-wheel vehicle of the series hybrid type, with each wheel being driven by an electrical machine specific thereto, which puts arrangements that are presented herein to good use to reconfigure dynamic control functions of the vehicle. That U.K. patent application, however, does not deal with braking but deals with a yaw moment to be imparted to a vehicle by electrical motors. Mention may also be made of U.K. patent GB 2 344 799, which also describes a four-wheeled vehicle of the series hybrid type, with each wheel being driven by an electrical machine specific thereto, and which more specifically describes an electrical braking operation used to assist a conventional mechanical friction-type braking system.

In practice, electrical machines function as generators so as to ensure moderate deceleration of the vehicle in which they are equipped, to recover as much energy as possible and store it in electrical accumulators, or indeed to dissipate the energy in order to reduce the stress suffered by the mechanical brakes of the vehicle. The main braking of a vehicle is ensured in effect by hydraulically controlled mechanical brakes, generally in an assisted manner and currently most frequently provided with an anti-lock function commonly known as "ABS". Braking is a crucial vehicle safety function. Mechanical brakes have considerable power, sufficient to cause a wheel to lock, with such power being limited by the anti-lock function, in association with maximum grip. To ensure passenger safety, the braking system of a passenger vehicle is generally capable of ensuring deceleration of the order of 1 "g", with g being the unit of acceleration for which the value "1" corresponds to Earth's gravity.

Furthermore, in an electrical traction vehicle, it is particularly worthwhile to incorporate an electrical machine in a wheel of the vehicle, because this does away with mechanical shafts and offers greater latitude with regard to the general architecture of the vehicle. Arrangements for incorporating electrical machines into wheels are known in the prior art. International publication WO 2003/065546 proposes arranging four electrical machines transmitting their torques to a wheel by means of a planetary gear train. European patent EP 0878332 discloses a ground-contact system that incorporates both a vertical suspension of a wheel within the system and a rotary traction electrical machine. There is a reduction stage between the wheel and the electrical machine, with the electrical machine being meshed with a toothed wheel coaxial with the wheel. Of course, the wheel includes a disc brake so as to ensure the service braking function. Furthermore, the ground-contact system includes a pivot so as to allow turning of the wheel. All the mechanical functions of a ground-contact system are thus incorporated into the wheel. Finally, German patent application DE 100 54 368 describes a wheel incorporating an electrical machine, and electronic means for controlling the electrical machine; the possibility of dispensing with mechanical brakes, except for immobilising the vehicle, is also discussed.

However, in the case of an electrical traction vehicle, dispensing with mechanical brakes is still risky because the electrical braking obviously needs to be powerful enough, and extremely reliable, without making either the vehicle or even its wheels heavier. Further, it has to be possible to control the electrical braking in such a way as to turn it into a proper service brake, thereby braking the vehicle without prejudice to course stability, while at the same time making good use of the grip available to the wheels, which grip may be extremely variable and nonuniform. Further, all the energy developed by the heaviest braking needs to be able to be absorbed.

An aim of the present invention is to propose a reliable, fully electrical braking system that simplifies the architecture of the ground-contact systems of the vehicles in which the electrical braking system is equipped. Aspects of the present invention provide practical means for performing the service braking function purely electrically, while at the same time ensuring a high level of safety.

BRIEF DESCRIPTION OF THE INVENTION

An aspect of the invention relates to a fully electrically controlled electrical braking system for a road vehicle fitted with wheels. Each wheel is connected for rotation to at least one rotary electric machine. Each rotary electrical machine cooperates with a single wheel, such that one electronic wheel control module controls the electric machine(s) of one and the same wheel (i.e., a single wheel). Each electronic wheel control module makes it possible to impart selectively to a corresponding wheel a control torque of determined amplitude and sign, in such a way that the corresponding wheel imparts to the vehicle a drive force or a braking force in accordance with the control torque of the determined amplitude and sign. The system includes a central unit ensuring management of vehicle displacement, the central unit controlling all the electronic wheel control modules, The central unit has a vehicle braking operating mode activated by a vehicle braking control signal having a given amplitude representing a total desired braking force for the vehicle and in which, in a braking mode, whatever the amplitude of the braking control signal, the central unit controls all the electronic wheel control modules in such a way that the sum of longitudinal forces of all the wheels outputted by the rotary electrical machines is a function of the amplitude of the braking control signal. The system further includes means for thermally dissipating electrical energy, with a power in excess of 350 kW per ton of vehicle, with all the rotary electrical machines being capable of outputting a peak power greater than 350 kW per ton of vehicle.

In the vehicle braking system of this aspect of the invention, there is no mechanical service brake. In one particularly advantageous embodiment of this aspect of the invention, none of the wheels of the vehicle includes a mechanical service brake. Whatever the amplitude of the braking control signal, i.e., even for the most intense braking, braking is ensured electrically, i.e., by using the electrical machines as generators. Each wheel includes one or more dedicated electrical machines so as to be able to generate a braking force selectively on each wheel, which could not be done with an electrical machine common to a plurality of wheels, for example the wheels on one axle, because in this case there would be a mechanical transmission and a differential between the wheels. The electrical machines are suitably dimensioned to impart to each wheel the greatest possible braking force.

Of course, the system includes means for thermally dissipating electrical energy, the means being capable of absorbing elevated electrical power. For example, the means may be provided by the installation of one or more electrical dissipation resistors that are cooled effectively, for example by water circulation. Typically, the known electrical accumulators are not capable of absorbing the electrical power produced by emergency braking or are not capable of absorbing all the electrical energy produced by prolonged braking, unless the installed capacity is such that it would make the weight of the vehicle truly prohibitive. It would also be possible to adopt other dissipative means, for instance a magnetic coupling between a coil and a ferromagnetic part cooled by water circulation. Thus, this aspect of the invention makes it possible to form a stand-alone electrical system isolated from the environment, capable of providing electrical braking of a vehicle in all travel circumstances and of doing so without any exchange of electrical energy with the exterior of the vehicle. The system therefore can be applied to motor vehicles, which is a far more difficult electric braking system application than in the case of vehicles connected to an electrical network, such as trains or urban trams.

The control electronics preferably incorporate redundancy. Advantageously, still for safety reasons, hardware redundancy is also provided. A particularly worthwhile embodiment of a braking system according to this aspect of the invention is described below, in which it is possible to distinguish:

a power stage in which flows the electrical power necessary for traction and the electrical power generated by electric braking,
  a low-voltage electrical supply stage for supplying energy to electronics for controlling and driving power elements, and
  a flow stage for the signals for controlling vehicle braking.

An architecture is proposed below in which each of these stages exhibits a certain level of redundancy. The proposed redundancies for each of the stages may each be used alone or in combination with one another. Of course, the level of reliability is raised by adding together all the proposed redundancies.

First of all, at the level of the power stage, a plurality of rotary electrical machines are used, at least two and preferably one per driving wheel, this providing a certain level of redundancy. Furthermore, preferably, the means for thermally dissipating electrical energy includes two electronic dissipation modules and two electrical dissipation resistors in order always to offer a certain deceleration capacity in the event of a breakdown of a resistor or its control module. This forms two sub-systems arranged as indicated below.

According to an important aspect, the invention proposes a fully electrically controlled electrical braking system for a road vehicle fitted with wheels, of which at least two wheels are each connected for rotation to at least one rotary electric machine. Each rotary electrical machine cooperates with a single wheel, and at least one electronic wheel control module controls the electrical machine(s) of one and the same wheel. Each electronic control module makes it possible to impart selectively to a corresponding wheel a control torque of determined amplitude and sign, in such a way that the corresponding wheel imparts to the vehicle a longitudinal drive force or a longitudinal braking force in accordance with the control torque of the determined amplitude and sign. The system is characterised in that it includes at least two sub-systems connected to a central electrical line, each of the sub-systems including:

a part of the wheels,
    the electronic control modules associated with each of the wheels of the part, and
  a dissipator supplied by an electronic dissipation module.

In one embodiment for a four-wheeled vehicle, preferably each of the wheels is mechanically connected to its own rotary electrical machine(s), with each of the sub-systems including two of the wheels. Preferably, each sub-system groups together the wheels of the vehicle disposed diagonally at opposite corners of the vehicle. It will be seen that this solution offers greater safety than the double hydraulic braking circuits commonly used in motor vehicles.

Furthermore, very advantageously, the low-voltage electrical supply stage for supplying energy to electronics for controlling and driving power elements includes two independent voltage sources. The low-voltage electrical supply stage includes a first supply and at least one second supply, with the first supply and the second supply being interconnected by a low-voltage electrical line having a first section and a second section connected by a galvanic isolator for isolating the two sections in the event of an undervoltage condition on one of them. Each electronic wheel control module and electronic dissipation module of one of the sub-systems is supplied by the first section and each electronic wheel control module and electronic dissipation module of the other of the sub-systems is supplied by the second section.

The first supply includes, for example, a voltage converter connected to the central electrical line. The electrical energy on this central line may originate either from a main source, such as for example a fuel cell, or from an electrical energy storage device, or from braking energy reused in real time. There is thus also a redundancy of energy sources. The second supply includes, for example, a low-voltage battery dedicated to this low-voltage electrical supply. Of course, it is possible to use for this second voltage source a second voltage converter itself also connected to the main line or alternatively directly to the storage device. The two voltage sources are interconnected by the electrical line that includes first section and the second section.

Finally, the vehicle braking control signal flow stage is constructed around two sensors connected mechanically, and preferably separately, to a braking control unit at the disposal of a driver, the sensors being exploited in a totally different manner as explained below.

It should also be pointed out that, preferably, to keep the vehicle immobile, a mechanical brake device is installed that is commonly known as a parking brake. However, such a device is not designed for braking the vehicle but only for keeping it stopped, preferably even on very considerable or steep slopes. Thus, the system according to this aspect of the invention includes, associated with one wheel at least, a mechanical wheel braking device controlled solely by a parking brake control. Preferably, this parking brake device is controlled by an electrical actuator controlled by a braking control unit that can only be activated below a longitudinal speed threshold of the vehicle, the threshold being, for example, less than 10 km/h.

In another aspect, the invention also covers a vehicle equipped with an electrical braking system, as described herein.

BRIEF DESCRIPTION OF THE FIGURES

Other objectives and advantages of aspects of the invention will become clearly apparent from the following description of a preferred but non-limiting embodiment, illustrated by the attached drawings, in which.

DESCRIPTION OF EMBODIMENTS OF THE INVENTION

Figure 1:
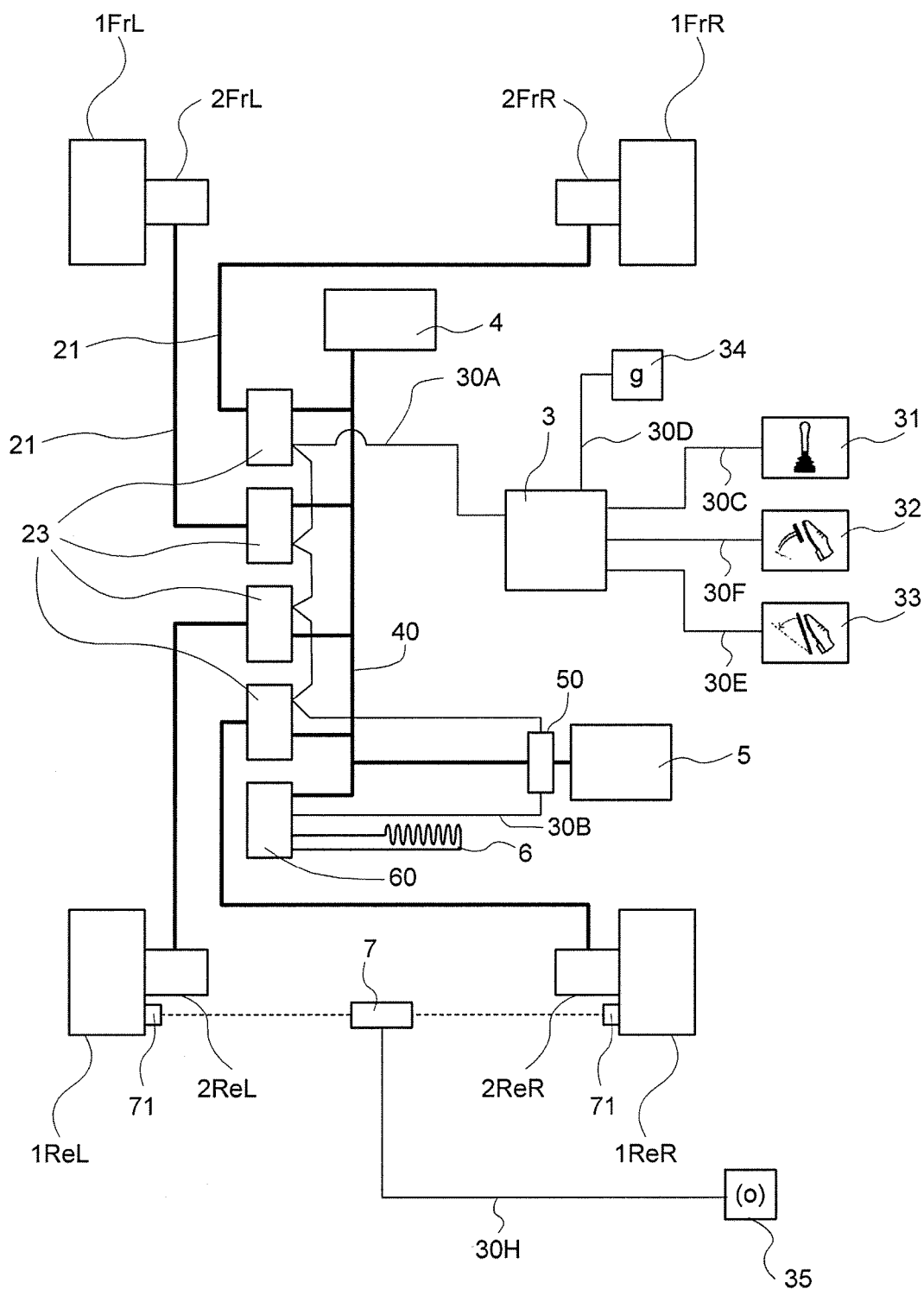
FIG. 1 is a schematic representation of a braking system of a four-wheeled vehicle, with on-board electrical energy production.

FIG. 1 is a schematic representation of a vehicle with four wheels $1_{FrL}$, $1_{FrR}$, $1_{ReL}$, and $1_{ReR}$. The wheels are designated $1_{FrL}$ for the left-hand front wheel, $1_{FrR}$ for the right-hand front wheel, $1_{ReL}$ for the left-hand rear wheel, and $1_{ReR}$ for the right-hand rear wheel. Each wheel is equipped with an electrical machine, which is coupled mechanically thereto. The electrical traction machines, which may be referred to herein simply as electrical machines or rotary electrical machines, are shown in the figure as $2_{FrL}$, $2_{FrR}$, $2_{ReL}$, and $2_{ReR}$. As used herein, the suffixes specifically denoting the position of the wheel 1 or of the electrical machine 2 in the vehicle will be used only if they contribute something to the clarity of the explanation. The electrical traction machines 2 are three-phase synchronous electrical machines, equipped with an angular position sensor of a resolver type, and are controlled by electronic wheel control modules 23 to which they are connected by electrical power lines 21. The electronic wheel control modules 23 are designed to control the electrical machines 2 with regard to torque. As a result, the electrical machines 2 may be used as motors and as generators. Each of the rear wheels $1_{ReL}$ and $1_{ReR}$ is furthermore equipped with a mechanical braking device 71 for the wheel, which is controlled by an electrical actuator 7 that in turn is controlled by a braking control unit.

Numerous arrangements are possible for arranging an electrical machine coupled mechanically to a wheel. It should be noted, however, that it is advantageous to provide quite considerable gearing down, for example at least equal to 10 and indeed preferably greater than 15, so that the electrical machine is not too bulky. It is possible to install an electrical machine coaxially with a wheel, with a mechanical link being ensured by a planetary gear train to provide the necessary gearing down. It is also possible to adopt a configuration of the type described in European patent application EP 0878332, preferably by adding a mechanical gearing down stage. It is also possible to provide a plurality of electrical machines, the torques of which are added together. In this case, an electronic wheel module may control in parallel a plurality of electrical machines installed in one and the same wheel. With regard to the installation of a plurality of electrical machines in one wheel, it is possible to consult, for example, International patent application publication WO 2003/065546 and French patent application FR 2776966.

An embodiment of the invention is illustrated in FIG. 1 as applied to a vehicle ensuring on-board production of electrical energy. A fuel cell 4 is illustrated, which supplies an electrical current over a central electrical line 40. Of course, any other means of supplying electrical energy may be used, such as for example through use of batteries. Also shown is an electrical energy storage device consisting in this example of a bank of supercapacitors 5 connected to the central electrical line 40 by an electronic regeneration module 50. An electrical dissipation resistor 6 is shown, preferably immersed in a heat-transfer liquid for dissipating heat towards an exchanger (not shown), constituting an energy absorption device capable of absorbing electrical energy produced by all the electrical machines during braking. The dissipation resistor 6 is connected to the central electrical line 40 by an electronic dissipation module 60.

A central unit 3 manages various functions, including the vehicle's electrical traction system. The central unit 3 interacts with all the electronic wheel control modules 23 as well as with the electronic regeneration module 50 via electrical lines 30A (CAN bus®). The central unit 3 also interacts with an acceleration control unit 33 via an electrical line 30E, with a braking control unit 32 (service brakes) via an electrical line 30F, and with a control unit 31 for selecting forward or reverse travel via an electrical line 30C. This makes it possible to take account of the intentions of the vehicle's driver. The central unit 3 also interacts with a longitudinal acceleration sensor 34 via an electrical line 30D. Finally, the electronic regeneration module 50 interacts with the electronic dissipation module 60 via an electrical line 30S.

The central unit 3 ensures management of a longitudinal displacement of the vehicle. The central unit 3 controls all the electronic wheel control modules 23. The central unit 3 has a vehicle braking operating mode (or braking mode) activated by a vehicle braking control signal having a given amplitude representing a total braking force desired for the vehicle. In the braking mode, whatever the amplitude of a braking control signal, the central unit 3 controls all the electronic wheel control modules 23 in such a way that a sum of longitudinal forces of all the wheels 1 outputted by the rotary electrical machine is a function of the amplitude of the braking control signal. In other words, there is no mechanical service brake; the electric braking system described herein is the service brake for the vehicle.

Also shown is a parking brake control unit 35. The actuator 7 of the mechanical wheel braking device is controlled via an electrical line 30H solely by this parking brake control unit 35, and absolutely not by the braking control unit 32. Preferably, in order to avoid any deterioration of the mechanical braking devices 71 designed solely to keep the vehicle immobile and whose capacity for dissipating heat is thus very limited, the parking brake control unit 35 can only be activated below quite a low longitudinal speed threshold of the vehicle, for example lower than 10 km/h.

The following is an explanation of an operation of the system according to an aspect of the invention.

When the driver selects forward travel using the control unit 31 and actuates an accelerator pedal (e.g., the acceleration control unit 33), the central unit 3 instructs the electronic wheel control modules 23 to supply energy to the electrical machines 2 by drawing electrical energy from the central electrical line 40. The latter is supplied by the fuel cell 4 and/or the bank of supercapacitors 5, depending on the state of charge thereof and under the control of the central unit 3. The vehicle thus moves forward. The electrical machines 2 convert the electrical energy into mechanical traction energy. The power used depends in particular on the position of the acceleration control unit 33.

When the driver actuates the brake pedal 32, the central unit 3 passes into braking mode. From the driver's action on a brake pedal (e.g., the braking control unit 32), the central unit 3 calculates a value for the braking control signal. Whatever the amplitude of the braking control signal, the central unit 3 controls all of the electronic wheel control modules 23 in such a way that a sum of longitudinal forces of all the wheels 1 is proportional to the amplitude of the braking control signal. The rotary electrical machines 2 then convert mechanical rotation energy into electrical energy.

Depending on the management strategy for the electrical energy programmed in the electronic regeneration module 50, the latter distributes the braking energy so as to recharge the bank of supercapacitors 5 and/or controls the electronic dissipation module 60 so as to dissipate the energy in the electrical dissipation resistor 6. It will be readily understood that, when storage means such as the bank of supercapacitors 5 are saturated, the entirety of the energy must be dissipated. Furthermore, the power of the storage means may be limited, that is, the charging speed of the storage means may, for example, correspond to light braking, as is commonly expected of a thermal engine (known as an "engine brake"). Beyond this level of braking, the electrical power produced is then directed towards dissipation means (e.g., the electrical dissipation resistor 6).

In order to ensure operating safety of the vehicle, the electrical dissipation resistor 6 is dimensioned and cooled in such a way that the entirety of the electrical energy produced during emergency braking operations, which are the most violent (i.e., strongest), may be dissipated. In fact, it is advisable to design the system to include the rotary electrical machines 2, the electronic wheel control modules 23, the central electrical line 40, the electronic dissipation module 60, and the electrical dissipation resistor 6 according to criteria of similar stringency to those applied to mechanical braking systems.

Preferably, all the (rotary) electrical machines 2 are capable of outputting a peak power greater than 500 kW per ton of vehicle, and preferably all the electrical dissipation resistors 6 form an energy absorption device of a power greater than 500 kW per ton of vehicle. In effect, if F is the force applied to brake the vehicle, if the mass of the vehicle is M and its speed is V, and if γ is the acceleration of the vehicle, then F=M*γ and P=F*V=M*(γ*V). Assuming that maximum deceleration is 1 g, at 130 km/h the power per ton of vehicle is approximately 350 kW and at 160 km/h it is approximately 500 kW. On the basis of this information, a person skilled in the art will readily proportion the power of the energy absorption device (e.g., the electrical dissipation resistors 6) and of the rotary electrical machines as a function of the characteristics of the vehicle that is to be constructed.

Thus, as in the example illustrating the above aspect of the invention, there are two sub-systems each having an electrical dissipation resistor, each of these electrical dissipation resistors 6A and 6B being of a power greater than 250 kW and all the (rotary) electrical machines 2 being capable of outputting a peak power greater than 500 kW, in each instance, per ton of vehicle.

When the driver selects reverse travel, the central unit 3 instructs the electronic wheel control modules 23 to reverse operation of the rotary electric machines 2, including in the event of braking.

The following is a description how it is possible to establish an anti-wheel-lock function according to an aspect of the invention.

Because the electrical traction machines 2 are equipped with an angular position sensor of a resolver type, and each wheel 1 has its own rotary electrical machine 2, a rotational speed sensor is thus provided for each wheel. It is on this basis that there is constructed a device for controlling a slip condition of each wheel, in which, in braking mode, a control torque of a wheel is reduced when the slip control device detects slip of the wheel in question. It is possible, for example, to analyse in real time a signal that the rotational speed sensor of each wheel outputs and to deduce from a marked variation (deceleration) the beginnings of locking. It is possible to calculate in real time a derivative of the rotational speed signal of each wheel, thus to obtain a signal representative of an acceleration/deceleration of each wheel and to compare the latter with a signal giving a real acceleration/deceleration of the vehicle, such as through use of the longitudinal acceleration sensor 34 already introduced above, or obtained from results of processing of a plurality of signals allowing estimation of the real acceleration/deceleration of the vehicle. Consequently, the central unit 3 may instruct the electronic wheel control modules 23 to reduce a wheel control torque (selectively by wheel) when the slip control device detects slip of the wheel in question. It should be noted that this reduction in torque may be managed directly by the electronic wheel control modules 23, which may react in real time to the speed and acceleration measured at the wheel, the central unit 3 transmitting for example maximum speed and acceleration instructions to be complied with.

In conclusion, it should be pointed out that the absence of a conventional braking member (c.f., disc and calipers in European application EP 0878332) substantially simplifies not only the architecture of the vehicle equipped with a system according to an aspect of the invention, but also maintenance thereof by eliminating periodic operations involving replacement of the pads and discs. Among the advantages achieved by eliminating conventional hydraulic braking members, mention may additionally be made of the elimination of any residual friction of the pads (it is known that this friction consumes a not inconsiderable part of the energy necessary for operation of a vehicle with conventional braking). Another advantage which may be noted is the elimination of thermal stresses brought about at the ground-contact system by the conventional hydraulic braking members, as well as the elimination of the nuisance associated with the dust produced by wear of the pads and of the discs.

The above description is of a traction system for a motor vehicle in which none of the wheels is equipped with mechanical brakes. The deceleration capacity of the vehicle stems from operating rotary electric machines as generators, the latter being designed so as to be able to cause each of the wheels of the vehicle to lock, that is, so that the wheels are capable of providing sufficient braking torque.

The remainder of the description illustrates a particular non-limiting example that makes it possible to build up a system having sufficient hardware redundancy to be able to ensure a very high level of safety in the braking system of the vehicle.

Figure 2:
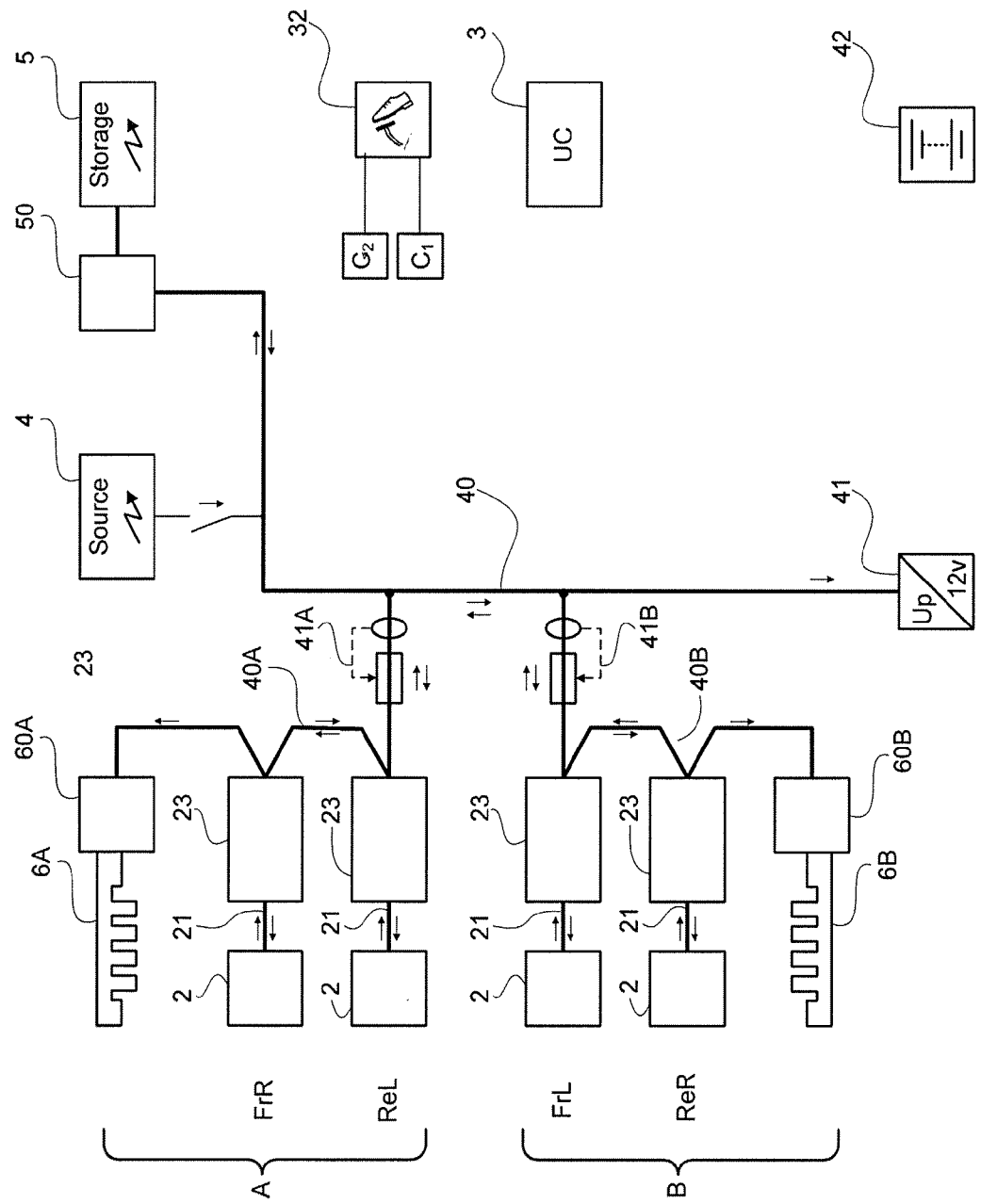
FIG. 2 is a diagram detailing a power flow arrangement organised to exhibit a certain hardware redundancy.

FIG. 2 shows that an electrical braking system that includes two sub-systems (A and B) connected to the central electrical line 40. Each of the sub-systems includes two wheels that each are connected for rotation to at least one rotary electrical machine 2 specific thereto. The right-hand front wheel and the left-hand rear wheel, or more precisely the rotary electrical machines 2 and the electronic wheel control modules 23 associated therewith, form sub-system A. The left-hand front wheel and the right-hand rear wheel, or more precisely the rotary electric machines 2 and the electronic wheel control modules 23 associated therewith, form sub-system B. Each sub-system includes an electrical dissipation resistor 6A or 6B, respectively, each supplied by an electronic dissipation module 60A or 60B, respectively.

If the various constituent elements of the traction system are examined with regard to the criterion of hardware redundancy, the rotary electrical machines 2 incorporated into the wheels form a system that naturally exhibits redundancy, because each of the wheels has its own electrical machine. The control electronics of these electrical machines, namely the electronic wheel control modules 23, likewise form a system that exhibits hardware redundancy, because each of these electrical machines 2 has its own control electronics.

During regenerative braking, each of the rotary electrical machines 2 supplies electrical energy on the electrical power line 40 via the electronic wheel control modules 23. This energy may either be stored in accumulators, such as the bank of supercapacitors 5, or be dissipated by the electrical power resistors 6A and 6B. During emergency braking, it is obviously impossible to count on the storage capacity of the accumulators, because the latter could very well already be at maximum charge and incapable of absorbing additional electrical energy. Consequently, the electrical resistor 6 is a member crucial to operational safety. Likewise, the electrical power line 4 is a crucial element for the operational safety of a fully electrical vehicle braking system. Various failure scenarios will be examined below.

FIG. 2 shows as the main source of electrical energy, for this example embodiment, a fuel cell 4. The figure also shows an accumulator battery allowing storage of electrical energy, which, in this example embodiment, is a bank of supercapacitors 5 and its electronic regeneration module 50. Finally, a supply of low-voltage electrical energy to the various electronic modules is ensured on the one hand by a voltage converter 41 allowing conversion of the voltage available on the electrical power line 40 into low voltage (for example 12 volts) used to supply the various control electronics, and on the other hand by a battery 42 such as a DC 12 volt battery used conventionally in a vehicle.

We have seen that, in order to ensure braking safety, the braking system is organised into two sub-systems, namely sub-system A, grouping together the right-hand front wheel and the left-hand rear wheel, and sub-system B, grouping together the left-hand front wheel and the right-hand rear wheel. Sub-system A is connected to the power line 40 via an overcurrent protection device 41A. Sub-system B is connected to the power line 40 via an overcurrent protection device 41B. Each of the sub-systems thus includes its own dissipation resistor 6A, 6B and each has its own control electronics 60A, 60B. Downstream of the device 41A, a section 40A of an electrical power line is connected to the electronic wheel control module 23 associated with the left-hand rear wheel, to the electronic wheel control module 23 associated with the right-hand front wheel, and finally to the electronic dissipation module 60A associated with the dissipation resistor 6A. A similar arrangement is present in sub-system B.

Each of the electronic wheel control modules 23 is capable, by itself, of controlling an electrical braking operation. Thus, in the event of damage to the power line 40 causing a break between the connection points of the overcurrent protection devices 41A and 41B, the two sub-systems, sub-systems A and B, remain operational and are independent of one another, with each being capable of ensuring electrical braking of the vehicle. Each of these sub-systems has its own electrical dissipation resistor. Accordingly, power stage hardware redundancy is thus provided.

The power stage may suffer failures other than a failure on the power line 40. It is possible, for example, for the section of the power line 40A ending at the electronic dissipation module 60A to be interrupted. In this case, the dissipation resistor 6A is out of circuit (i.e., not in operation). The electrical power produced by sub-system A during electrical braking may pass through the uninterrupted section of the electrical power line 40A and, via the overcurrent protection device 41A, pass back to the power line 40 and be channelled, via the power line 40B, towards the electrical dissipation resistor 6B. The electrical dissipation resistor 6B thus becomes common, in this case, to sub-system A and sub-system B.

Even if the electrical dissipation power available is divided in two, in this case precisely, the deceleration capacity of the electric braking system remains considerable, being sufficient to ensure emergency braking. In effect, each of the electrical dissipation resistors 6 is immersed in a hydraulic cooling circuit. In the event of emergency braking, the energy produced by electrical braking is sufficient to bring the cooling fluid to a boiling point. All the same, as it is transformed into the vapour phase, the vaporised fluid is immediately replaced by cooling fluid in the liquid phase, which again washes against the resistor so that the system continues to exhibit a certain capacity for heat dissipation. Furthermore, the cooling system exhibits a degree of temperature lag. Experiments performed by the applicant have demonstrated that, even with this scenario, the electrical braking system remains considerably more powerful and effective than a hydraulic crosswise braking system, such as those presently used in motor vehicles.

If the electrical power line 40A is interrupted between the electronic wheel control module 23 associated with the right-hand front wheel and the electronic wheel control module 23 associated with the left-hand rear wheel, then in this case the electrical dissipation resistor 6A remains available for the rotary electrical machine 2 associated with the right-hand front wheel when it functions as a generator, whereas the electrical dissipation resistor 6B is available for sub-system B and for the rotary electrical machine 2 associated with the left-hand rear wheel, that is, one of the rotary electrical machines 2 of sub-system A. One of the electrical dissipation resistors 6B will receive higher electrical power than the other 6A. Operation is not optimal, but the configuration is less disadvantageous for the deceleration capacity of the vehicle than that explained in the previous paragraph.

If, for any reason, a failure causes opening of the overcurrent protection device 41A, thus isolating the sub-system A, then in this case also the braking capacities of the vehicle remain at maximum because the electrical dissipation resistors are designed so as to be able, overall, to ensure full deceleration of the vehicle even when the electrical energy accumulator, consisting here of the bank of supercapacitors 5, is at maximum charge. In this case, the situation is not one of breakdown of the electrical braking system as regards maximum deceleration capacity. Admittedly, the situation is not optimal as regards general management, because in particular the possibility of regenerating energy is lost, but this is not detrimental to safety.

If any one of the failures which have just been explained for sub-system A occurs in sub-system B, for reasons of symmetry, the electrical braking safety conditions plainly remain identical. In conclusion, by organising the power stage into two independent sub-systems, sub-system A and sub-system B, each connected to the main electrical power line 40 of the vehicle by its own overcurrent protection device (devices 41A and 41B) and by equipping each of the sub-systems with its own electrical dissipation resistor, double hardware redundancy is provided, such that it is possible to ensure excellent safety conditions for electrical braking of the vehicle.

Figure 3:
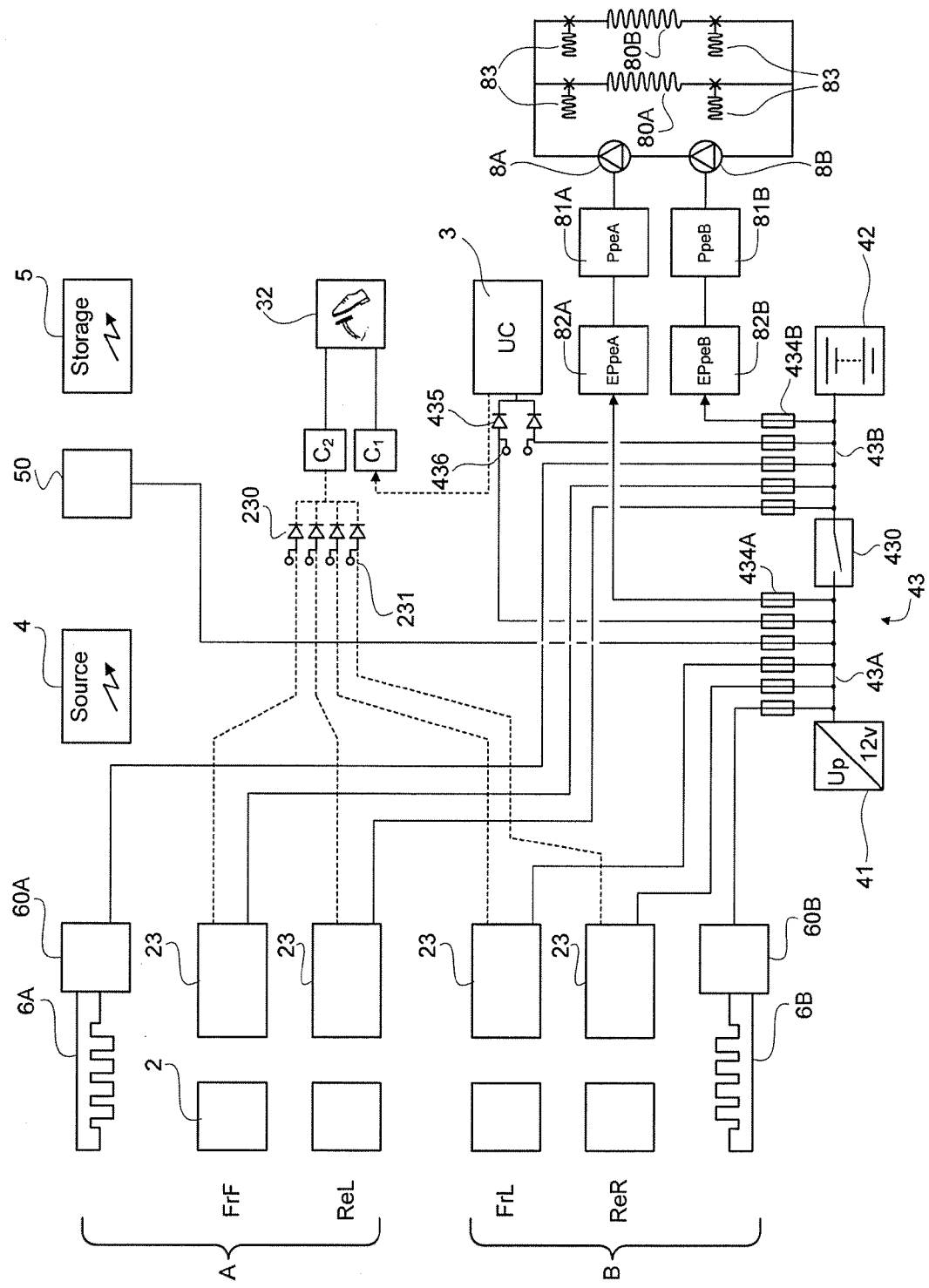
FIG. 3 details an arrangement for supplying low-voltage electrical energy to various control electronics.

The dissipation power of the electrical dissipation resistors 6A and 6B depends on good operation of the cooling system of the vehicle. In effect, they are immersed in a heat-transfer fluid. FIG. 3 is a schematic representation of a cooling circuit. It may be seen that the cooling circuit includes two pumps 8A and 8B and two radiators 80A and 80B. The two pumps 8A and 8B are mounted in series and each is controlled by its own electrical motor 81A and 81B, respectively. Each of these electrical motors is controlled by its own control electronics 82A and 82B. The radiators 80A and 80B are mounted in parallel, and fitted with valves 83, which make it possible to isolate each of the radiators selectively in the event of leaks in one thereof. On the other hand, the pumps and pump actuating motor assemblies are designed in such a way that, if one of the pumps is out of order, the other pump is capable of ensuring a sufficient flow rate for the heat-transfer fluid despite the fact that the other pump is no longer functional.

A description will now be provided of the supply of low-power electrical energy to the various control electronics and to the various auxiliaries, with reference to FIG. 3. This figure shows the electronic dissipation modules 60A and 60B of the two electrical dissipation resistors 6A and 6B, the electronic wheel control modules 23 each associated with one of the four electrical machines 2, and the electronic regeneration module 50 associated with the bank of supercapacitors 5. Also shown is the central unit 3, the control electronics 82A of one of the pumps of the cooling circuit, and the control electronics 82B of the other one of the pumps of the cooling circuit. The brake pedal 32 is assumed to be sufficiently safe as a result of its construction and is thus not duplicated. Two position sensors, C1 and C2, are each associated with the brake pedal and each supply a signal representing the command desired by the driver of the vehicle.

The redundancy for supplying low-voltage electrical energy is designed as follows. Because there are provided, on the one hand, a voltage converter 41 connected to the electrical power line 40 and supplying a 12 volt direct voltage and, on the other hand, a battery 42 also supplying a 12 volt direct voltage, certain elements will be connected to the voltage converter 41 and other elements will be connected to the 12 volt battery as follows. A line 43 ensures interconnection between the voltage converter 41 and the battery 42. This line 43 includes a first section 43A and a second section 43B, as well as a galvanic isolator 430 isolating the two sections in the event of an undervoltage condition on one of them. Certain elements are connected to the first section 43A, each via an overcurrent protection device 434A. Certain elements are connected to the section 43B, each via an overcurrent protection device 434B.

For example, to ensure good operation of the pumps of the cooling circuit, one of the motors 81A is connected to the first section 43A via its control electronics 82A. The other one of the motors 81B is connected to the second section 43B via its control electronics 82B. The control electronics of sub-system A, namely the electronic wheel control module 23 associated with the rotary electrical machine 2 of the right-hand front wheel, the electronic wheel control module 23 associated with the rotary electrical machine 2 of the left-hand rear wheel, and the electronic dissipation module 60A of the dissipation resistor 6A are connected to the second section 43B, whereas the same corresponding electronics of sub-system B are connected to the first section 43A.

The central unit 3 ensuring management of vehicle displacement, through control of all the electronic wheel control modules 23, benefits from a double electrical connection. It is connected both to the first section 43A and the second section 43B via a pair of diodes isolating the first and second sections 43A and 43B. The central unit 3 is connected via a diode 435 so as to ensure continuity of electrical supply of the central unit 3, even in the event of a breakdown of one of the two low voltage sources. Furthermore, a suitable circuit 436 monitors the presence of electrical voltage on each of the supply lines in order to send a fault signal in the event of a breakdown of one of the two electrical supplies. The electronic regeneration module 50 associated with the bank of supercapacitors 5 is connected solely to the first section 43A. It should be noted that this type of double connection could also be used for all the electronics, in particular for the electronic wheel control modules 23.

It may thus be seen that if, for any reason, there was a serious fault on the voltage converter 41, the galvanic isolator 430 would interrupt the interconnection between the voltage converter 41 and the battery 42 and the latter could continue with supplying low-voltage energy to the control electronics associated with sub-system A and the central unit 3 as well as one of the two pumps of the hydraulic cooling circuit. Conversely, if there was a significant fault at the battery 42, the galvanic isolator 430 could break the interconnection and the voltage converter 41 could continue to supply sub-system B, the central unit 3, and one of the pumps of the hydraulic cooling circuit. It may thus be seen that the architecture described makes it possible to maintain operation of one of the two sub-systems A or B and thus half of the vehicle braking power is still available.

A description will now follow of supply energy to the braking sensors C1 and C2, which are the first link in the braking control system. It should be remembered that the system according to an aspect of the invention includes a central unit 3, which controls all of the electronic wheel control modules 23. On the other hand, the system according to an aspect of the invention includes a braking control unit 32 available to a driver, the control unit being connected mechanically at least to a first sensor C1 outputting a vehicle braking control signal having a given amplitude representing a total braking force desired for the vehicle, and to a second sensor C2 outputting a vehicle braking control signal having a given amplitude representing the total braking force desired for the vehicle.

The architecture of the system has allotted a different role to sensors C1 and C2. The sensor C1 is supplied with low-voltage electrical energy by the central unit 3. It outputs the control signal to the central unit 3 and the latter receives the braking control signal only from sensor C1 to create a first level of overall vehicle braking control signals. The second sensor C2 is supplied by the electronic wheel control modules 23 associated with each of the electrical machines. The second sensor C2 outputs its control signal to each of the electronic wheel control modules 23. Of course, a diode 230 is included in the connecting line between each of the control electronics 23 and the sensor C2. Furthermore, a suitable circuit 231 monitors the presence of electrical voltage on each of the four supply lines in order to send a fault signal in the event of a breakdown of one of the four electrical supplies. In the following paragraph it will be seen that sensor C2 is directly associated with the wheel control electronics 23 and solely with the wheel control electronics 23.

It has just been seen that the low-voltage electrical supply stage includes a first supply and at least one second supply, the first supply and the second supply being interconnected by an electrical line 43 that includes a first section 43A and a second section 43B, the first and second sections being connected by a galvanic isolator 430 isolating the two sections and capable of breaking the interconnection on demand, in the event of undervoltage condition on one thereof. The first sensor C1 is supplied by the same section as the central unit 3 and the second sensor C2 is supplied both by the wheel control electronics 23 of one (A) of the sub-systems and by the wheel control electronics 23 of the other (B) of the sub-systems via a pair of diodes isolating the supplies.

Figure 4:
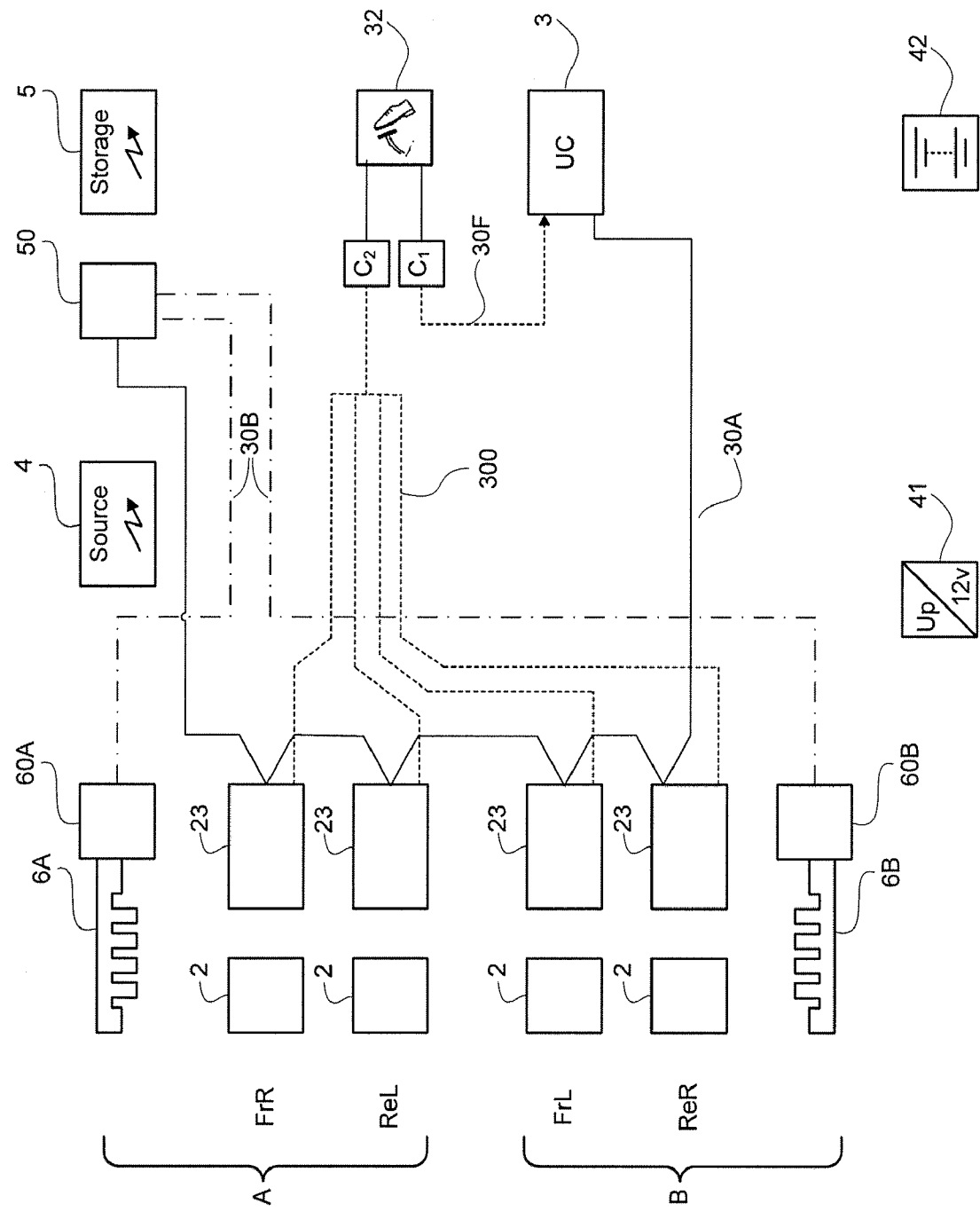
FIG. 4 details an arrangement of control lines between control electronics of various elements and a central unit.

In FIG. 4, it may be seen that the central unit 3 is interconnected with each of the electronic wheel control modules 23 and with the electronic regeneration module 50 by a CAN bus® (Control Area Network, designated by reference numeral 30A) allowing the transfer of control instructions in computerised form. The central unit 3 is loaded with software suitable for being able to take into account all the desired parameters in order to develop a braking control signal that is sent to the various electronics controlling the machines in accordance with the desired protocols for circulation through the CAN bus 30A. Each of the electronic wheel control modules 23 additionally directly receives analogue signals output by the sensor, this time via analogue lines 300.

Finally, control lines 30B connect the electronic regeneration module 50 to the electronic dissipation modules 60A and 60B. In the event of a fault at the electronic regeneration module 50, the electronic dissipation modules 60A and 60B retain the possibility of dissipating the braking power, which automatically passes back to the power line 40 without receiving a command on line 30B. The sub-systems A and B thus remain fully operational for braking but without the possibility of storing energy, because, in the latter instance, the electronic regeneration module 50 is out of service.

To return to the creation of braking torques by the electrical machines 2, control of the electrical machines 2 is ensured directly by an electronic wheel control module 23 specific to each of the electrical machines 2. The module is loaded with software suitable for controlling each electrical machine with regard to torque depending on the control signals received. Each electronic wheel control module 23 receives braking control signals on the one hand on bus 30A and on the other hand on the analogue line 300 supplying the signal from sensor C2. Each electronic wheel control module 23 may thus compare at any moment the control signal supplied on bus 30A and the control signal supplied by the analogue line 300 and, within a certain tolerance margin, for example of the order of 10 to 20% depending on what is determined experimentally, give priority to the braking control signal coming from bus 30A. This is the normal operating mode.

On the other hand, if, due to malfunctioning of the central unit 3 or of the software established in the central unit 3, the braking control signal sent by the bus 30A was much lower than the braking control signal coming directly in analogue manner from sensor C2, priority may be given to the control signal coming from sensor C2 to ensure operational safety when braking the vehicle. It can be seen that the proposed architecture utilises differently the signals supplied by each of sensors C1 and C2. Sensor C1 is associated with the central unit 3 and makes it possible to calculate a first level overall braking signal. On the other hand, the control signal supplied by sensor C2 is supplied directly in analogue manner by suitable lines to the electronic wheel control modules 23. Overall coherence is ensured by comparing the various signals. The signal corresponding to the highest deceleration demand, within a selected tolerance margin, then takes priority. In this way, braking control safety is ensured even in the event of a breakdown of the bus 30A, or of a section of the bus, or of any of the analogue lines 300.

In addition to all the above, it is possible to establish a possibility of creating a braking signal predetermined by an emergency command by means for example of an emergency button at the disposal of the driver. This type of braking command is taken into account by the central unit 3, more precisely by the software established in the central unit 3, and is routed to the control electronics 23 of each of the machines by the CAN bus 30A. This may ensure operating safety during braking even if the brake pedal breaks off. Likewise, this may ensure operating safety during braking in the event of breakage of the two sensors or breakage of the fixing means of the two brake sensors C2 and C2. If only the mechanical connection of one of the two sensors C1 or C2 or one of the two sensors is faulty, operating safety during braking is of course ensured, as explained in the previous paragraph. However, in this case it is possible, for example, to allow the journey to be brought to an end and, once the vehicle has stopped, to prevent it from starting again.

Finally, it should be pointed out that the hardware redundancy explained above is preferably used in combination with software redundancy, advantageously both with regard to the software loaded in the central unit 3 and that loaded in the electronic wheel control modules 23. In this way, a high degree of safety is achieved for a fully electrical vehicle braking system.

The invention claimed is:

1. An electrical braking system for a road vehicle fitted with wheels, each wheel being connected for rotation to at least one rotary electrical machine such that each rotary electrical machine cooperates with a single wheel, each wheel including an electronic wheel control module controlling the at least one rotary electrical machine of the wheel, each electronic control module being configured to impart selectively to a corresponding wheel a control torque of determined amplitude and sign such that the corresponding wheel imparts to the vehicle a longitudinal drive force or a longitudinal braking force in accordance with the control torque, the electrical braking system comprising:

a central unit for managing a longitudinal displacement of a vehicle, the central unit controlling all electronic wheel control modules of wheels of the vehicle, wherein the central unit has a vehicle braking mode activated by a vehicle braking control signal having an amplitude representing a total desired braking force for the vehicle such that, in the braking mode, the central unit controls all the electronic wheel control modules so that a sum of longitudinal forces of all the wheels, outputted by the rotary electrical machines of the wheels, is a function of the amplitude of the braking control signal, and means for thermally dissipating electrical energy, with a power in excess of 350 kW per ton of the vehicle, wherein all of the rotary electrical machines are able to output a peak power greater than 350 kW per ton of the vehicle.

2. An electrical braking system according to claim 1, wherein the function of the amplitude of the braking control signal is a proportional function.

3. An electrical braking system according to claim 1, further comprising a mechanical braking device associated with at least one wheel and operated by an electrical actuator controlled by a braking control unit, wherein the braking control unit is only able to be activated below a longitudinal speed threshold of the vehicle lower than 10 km/h.

4. An electrical braking system according to claim 1, further comprising a mechanical braking device associated with at least one wheel, wherein the mechanical braking device is operated solely by a parking brake control unit.

5. An electrical braking system according to claim 1, wherein the electrical braking system does not include a mechanical service brake.

6. A electrical braking system according to claim 1, further comprising a slip control device for controlling a slip condition of a wheel, wherein, in the braking mode, a control torque of the wheel is reduced when the slip control device detects slip occurring in the wheel.

7. An electrical braking system according to claim 6, wherein the slip control device calculates in real time a derivative of a rotational speed signal of the wheel to obtain a calculated signal representative of an acceleration/deceleration of the wheel and makes a comparison of the calculated signal with a signal giving an actual acceleration/deceleration of the vehicle measured by a longitudinal acceleration sensor.

8. An electrical braking system according to claim 1, wherein each rotary electrical machine is an electrical traction machine fitted with an angular-position sensor, the angular-position sensor being of a resolver type.

9. An electrical braking system according to claim 1, wherein the means for thermally dissipating electrical energy includes one or more electrical dissipation resistors.

10. An electrical braking system according to claim 1, wherein each wheel includes a built-in rotary electrical machine.

11. An electrical system according to claim 10, wherein a reduction ratio between each wheel and its built-in rotary electrical machine is greater than 10.

12. An electrical system according to claim 10, wherein a reduction ratio between each wheel and its built-in rotary electrical machine is greater than 15.

13. An electrical braking system according to claim 1, further comprising at least two sub-systems connected to a central electrical line, each of the at least two sub-systems including:
   a part of the wheels of the vehicle,
   the electronic control modules associated with the wheels of the part, and
   a dissipater that operates in accordance with an electronic dissipation module.

14. An electrical braking system according to claim 13, wherein the at least two sub-systems include a total of two sub-systems
   wherein the vehicle includes four wheels, each wheel being connected for rotation to at least one rotary electrical machine specific thereto,
   wherein each of the two sub-systems includes two of the four wheels, and
   wherein each of the two sub-systems groups together two wheels of the vehicle disposed diagonally at opposite corners of the vehicle.

15. An electrical system according to claim 13,
   wherein the at least two sub-systems include a total of two sub-systems,
   wherein the dissipator of each sub-system is of a power rating greater than 250 kW per ton of the vehicle, and
   wherein all the rotary electrical machines are able to output a peak power greater than 500 kW per ton of the vehicle.

16. An electrical system according to claim 13, wherein in which each of the at least two sub-systems is connected to the central electrical line by an overcurrent protection device, and wherein means for supplying electrical energy is connected to the central electrical line.

17. An electrical system according to claim 13, further comprising a low-voltage electrical supply stage for supplying low-voltage electrical energy to electronics for controlling and driving power elements,
   wherein the low-voltage electrical supply stage includes a first supply and a second supply,
   wherein the first supply and the second supply are interconnected by a low-voltage electrical line that includes a first section and a second section,
   wherein the first section and the second section are connected by a galvanic isolator for isolating the two sections, the isolator being able to break an interconnection of the first supply and the second supply on demand, in an event of an undervoltage condition on one of the first and second supplies,
   wherein each electronic wheel control module and an electronic dissipation module of one of the sub-systems is supplied by the first section and each electronic wheel control module and an electronic dissipation module of another of the sub-systems is supplied by the second section.

18. An electrical system according claim 13, further comprising a braking control unit available to a driver of the vehicle, wherein the braking control unit is mechanically connected to least:
   a first sensor, which outputs a vehicle braking control signal having an amplitude representing a total braking force desired for the vehicle, the first sensor outputting its control signal to the central unit, and
   a second sensor, which outputs a vehicle braking control signal having an amplitude representing the total braking force desired for the vehicle, the second sensor outputting its control signal to each of the electronic wheel control modules.

19. An electrical system according to claim 18, further comprising a low-voltage electrical supply stage for supplying low-voltage electrical energy to electronics for controlling and driving power elements,
   wherein the low-voltage electrical supply stage includes a first supply and at least one second supply,
   wherein the first supply and the second supply are interconnected by an electrical line that includes a first section and a second section,
   wherein the first and second sections are connected by a galvanic isolator for isolating the two sections,
   wherein the galvanic isolator is able to break an interconnection of the first supply and the second supply on demand in an event of an undervoltage condition on one of first and second supplies
   wherein the first sensor is supplied by a same section as the central unit (3),
   wherein the second sensor is supplied both by wheel control electronics of a first sub-system (A) and by wheel control electronics of a second sub-system (B) via a pair of diodes respectively isolating supply connections therefor.

* * * * *

UNITED STATES PATENT AND TRADEMARK OFFICE
CERTIFICATE OF CORRECTION

| | | |
|---|---|---|
| PATENT NO. | : 8,246,120 B2 | Page 1 of 1 |
| APPLICATION NO. | : 12/293945 | |
| DATED | : August 21, 2012 | |
| INVENTOR(S) | : Gerard Bourqui et al. | |

It is certified that error appears in the above-identified patent and that said Letters Patent is hereby corrected as shown below:

In the Specification

<u>COLUMN 6</u>

Line 32, "line 303." should read --line 30B.--.

<u>COLUMN 8</u>

Line 1, "description" should read --description of--.

In the Claims

<u>COLUMN 15</u>

Line 45, "sub-systems" should read --sub-systems,--.
    Line 61, "in" should be deleted.
    Line 62, "which" should be deleted.

<u>COLUMN 16</u>

Line 28, "least:" should read --at least:--.
    Line 52, "supplies" should read --supplies,--.
    Line 54, "unit (3)," should read --unit (3), and--.

Signed and Sealed this
Eighth Day of March, 2016

Michelle K. Lee
*Director of the United States Patent and Trademark Office*